UNITED STATES PATENT OFFICE.

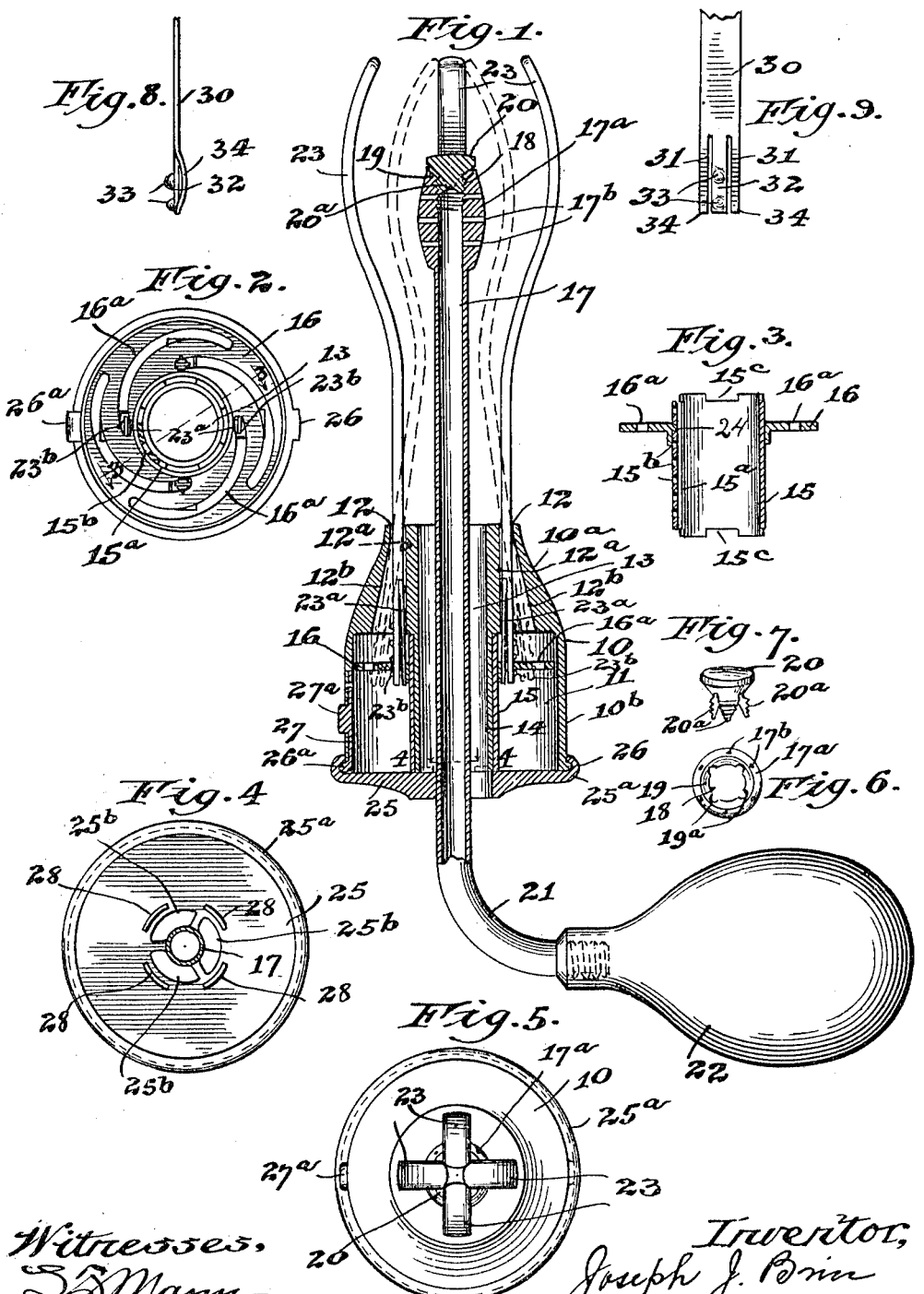

JOSEPH J. BRIN, OF CHICAGO, ILLINOIS.

SYRINGE.

983,871.  Specification of Letters Patent.  Patented Feb. 14, 1911.

Application filed March 27, 1909. Serial No. 486,156.

*To all whom it may concern:*

Be it known that I, JOSEPH J. BRIN, a citizen of the United States, residing at Chicago, in the county of Cook and State of Illinois, have invented certain new and useful Improvements in Syringes, of which the following is a specification.

My invention relates in general to syringes, but pertains more in particular to a syringe having a series of adjustable, expanding and contracting fingers, in combination with a spray tube and bulb member, whereby the walls of the vagina and other internal organs may be easily dilated and cleansed and the fingers then contracted and withdrawn without injury to the membrane tissue.

The main objects of the invention are to provide an improved means for effecting irrigation of the organs, for securing better hygienic sanitation, and for increasing the efficiency of medicinal application by properly cleansing the parts of disease secretions.

Other objects of the invention are to provide an effective syringe that is easily operated; to provide a syringe that is capable of being quickly and thoroughly cleaned; to provide an adjustable syringe the fingers of which may be shortened or lengthened, and to simplify and reduce the cost of production of articles of this character.

Further advantages of the invention will appear throughout the specification.

In the accompanying drawing,—Figure 1 is an elevational view of the device partly in central longitudinal section. Fig. 2 is an end view of the chambered body member of the syringe with the cap or cover thereof removed. Fig. 3 is a section on the line 3—3 of Fig. 2. Fig. 4 is an inner face view of the cap or cover of the body member, with the spray tube to which it is secured shown in cross-section. Fig. 5 is an end view of the syringe, with the fingers in contracted position. Figs. 6 and 7 are detail end and perspective views of the nozzle and sprayplug therefor, respectively; and Figs. 8 and 9 are edge and side views, respectively, of the inner ends of the fingers, showing an alternative securing means therefor.

Referring now more particularly to the drawing, 10 represents the body member of the device, which is preferably composed of hard rubber, having a conical or tapered end 10$^a$ for substantially one-half of its length, the remaining half 10$^b$ being cylindrical and hollow in cross section to form the chamber 11. The tapered end 10$^a$ has formed therein finger receiving apertures 12. The apertures 12 are tapering, the inner walls 12$^a$ being arranged substantially parallel with the axis of the body member, while the outer walls 12$^b$ diverge from the inner walls to form a wide mouth to the apertures where they open into the circular chamber 11. The tapered end 10$^a$ is provided with a tube-receiving axial bore 13; and an annular guide member 14, of equal internal diameter with the diameter of the bore 13, is secured to the body member within the chamber 11; the inner walls of both guide and bore being in alinement.

Slidably mounted on the guide member 14 is a sleeve 15, split longitudinally, as shown at 15$^a$ so as to be transversely elastic and provided with a series of perforations or apertures 15$^b$ adjacent to one of its longitudinal edges. Notches 15$^c$ are formed at the ends of the disk guide member 15, four notches being preferably formed at each end, which constitute the female members of a clutch mechanism which will be hereinafter described. Adjustably mounted upon said sleeve 15 is a cam member or disk 16 having eccentric slots 16$^a$ formed therein, the purpose of said slots being hereafter described.

An apertured spray tube 17 extends through the body member 10 having a nozzle 17$^a$ secured thereto in any suitable manner, or formed integral therewith, suitable apertures 17$^b$ being formed therein that communicate with the interior of the tube. The free end of the nozzle is provided with a threaded opening 18 terminating in a flared mouth 19 having a series of grooves 19$^a$ formed on the flared surface. A solid plug 20 having threaded prongs 20$^a$ coöperating with the threaded aperture 18 is adapted to partially close said aperture whereby any liquid forced through said spray tube will be forced through said apertures 17$^b$ and grooves 19$^a$ around said plug. The other end 21 of said spray tube is preferably curved and a bulb 22 of the ordinary character is connected therewith.

The expanding and contracting fingers 23 are bowed at the outer ends, which preferably extend beyond the end of the nozzle, the inner ends extending through the conical apertures 12 and engaging the cam disk 16 in the following manner. Spring tongues 23ª are secured to the inner ends of the fingers 23 on the inner sides of the latter in such a manner that the free ends of the tongues lie normally separated from the ends of the fingers. Small lugs or swells 23ᵇ are pressed or otherwise formed on the inner ends of the fingers on the outer sides thereof; and when the spring tongues are pressed against the ends of the fingers both may be forced into the eccentric slots 16ª whereupon by releasing the tension on the tongues one edge of the slots is confined between two adjacent lugs 23ᵇ and the fingers and disk 16 are thus united in such manner that the disk may have a rotating movement relative to the fingers, but is locked against a longitudinal movement relative thereto. In Fig. 1 the fingers are shown as extended their full length, but when it is desired to shorten them the fingers may be moved longitudinally relative to the disk 16 by compressing the spring tongues 23ª so that the disk will lie between any inner adjacent pair of lugs or swells (23ᵇ). A further manner of adjusting the fingers as to their length is by adjusting the disk 16 longitudinally of the sleeve 15; a projection 24 of the disk being adapted to enter any one of the perforations 15ᵇ. A still further manner of adjustment would be to invert the sleeve 15 and disk 16, so as to bring the disk 16 nearer the open end of the body member. This latter form of adjustment could be accomplished without moving the disk longitudinally, relative to either the sleeve or fingers. The expanding or contracting of the fingers is effected by means of the movable end cap 25 of the body member in the following manner. The open end of the body member is formed with a laterally projecting lug 26; and diametrically opposite the same is a spring tongue 27 secured to the inner wall of the chamber of the body member and formed at its outer end with a similar laterally projecting lug 26ª, said spring tongue having a button 27ª projecting through a suitable aperture in the body member. The cap or cover 25 is formed with an inwardly turned flange 25ª, which, by depressing the spring 27, is readily engaged and interhooked with the lugs 26 and 26ª, in the manner shown in Fig. 1, so as to be capable of a rotary movement relative to the body member 10. The cap 25 is centrally apertured to fit the spray tube 17 and is soldered or otherwise secured to the latter. Said cap is further provided with one or more apertures 25ᵇ around the spray tube, the purpose of which is to permit a free return of the water discharged by the spray tube. On the inner face of said cap is also located an annular series of lugs 28 constituting the male members of a clutch mechanism adapted to interlock and coöperate with the notches 15ᶜ in either end of the sleeve 15. It will thus be seen that a turning movement of the cap relatively to the body-member 10 effects the rotation of the sleeve 15 on which the cam disk 16 is mounted, causing the latter to turn. The turning movement of said disk, through the engagement of the cam slots 16ª with the inner ends of the fingers, effects a rocking or tipping movement of the latter, a movement of the disk in one direction causing the inner ends of the fingers to approach the axis of the cam so as to produce an expanding movement of the projecting portions of the fingers, and an opposite movement of the cam disk resulting in corresponding opposite movements of the fingers.

I am aware that a rotary disk having cam grooves coöperating with the ends of the fingers has heretofore been proposed, but the provision of a cam disk with eccentric slots has numerous advantages thereover in positively securing the fingers against longitudinal displacement, as well as permitting the described adjustments of the fingers, and the easy cleaning of the device.

In Figs. 8 and 9, I have illustrated a modification in the means for detachably locking the inner ends of the fingers in the cam disk 16. In this form the inner ends of the fingers 30 are longitudinally split for a short distance, as at 31, thereby forming a central tongue 32 having the lugs or swells 33; and, on either side thereof, integral bow springs 34, which have the same function as the springs 23ª above described.

It is, of course, obvious that the degree of lateral movement of the fingers may be regulated entirely by the curvatures given to the eccentric or cam slots. It can thus be readily seen that a movement of the cap (25) readily effects the expanding or contracting of the fingers; and as the fingers are adjustable, as to their length, in any of the several ways indicated, it follows that the instrument is capable of very fine adjustment as to length. The individual parts are few in number and are readily assembled and taken apart for purposes of adjustment or cleaning. In this connection I may mention that by unscrewing the end plug 20 of the spray nozzle, the entire bore of the spray tube is left free and unobstructed, which greatly facilitates the cleaning out of the latter.

Numerous other advantages will be apparent to those skilled in the art; and therefore, without limiting myself to the precise details shown and described, I claim:

1. In a syringe, the combination with a hollow body member and a spray tube extending axially therethrough, of a series of distensible fingers surrounding said spray tube, a sleeve rotatably mounted in said body member, a cam disk carried by said sleeve and engaging the inner ends of said fingers, and a rotatable cap closing the outer end of said hollow body member, said cap and the adjacent end of said sleeve being provided with coöperating clutch members, substantially as described.

2. In a syringe, the combination with a hollow body member and a spray tube extending axially therethrough, of a series of distensible fingers surrounding said spray tube, a sleeve rotatably mounted in said body member, a disk mounted on said sleeve and provided with a series of eccentric slots through which the inner ends of said fingers project, and a rotatable cap closing the outer end of said hollow body member, said cap and adjacent end of said sleeve being provided with coöperating clutch members, substantially as described.

3. In a syringe, the combination with a hollow body member and a spray tube extending axially therethrough, of a series of distensible fingers surrounding said spray tube, an invertible sleeve rotatably mounted in said body member, a cam disk carried by said sleeve and engaging the inner ends of said fingers, and a cap closing one end of said hollow body member, said cap and both ends of said sleeve being provided with coöperating clutch members, substantially as described.

4. In a syringe, the combination with a hollow body member and a spray tube extending axially therethrough, of a series of distensible fingers surrounding said spray tube, an invertible sleeve rotatably mounted in said body member, a cam disk mounted on and adjustable longitudinally of said sleeve and engaging the inner ends of said fingers, and a cap closing one end of said hollow body member, said cap and both ends of said sleeve being provided with coöperating clutch members, substantially as described.

5. In a syringe, the combination with a hollow body member and a spray tube extending axially therethrough, of a series of distensible fingers surrounding said spray tube, an invertible sleeve rotatably mounted in and coaxially with said body member, a disk mounted on and adjustable longitudinally of said sleeve and provided with a series of eccentric slots engaging the inner ends of said fingers, and a removable cap closing one end of said hollow body member, said cap and both ends of said sleeve being provided with coöperating clutch members, substantially as described.

JOSEPH J. BRIN.

Witnesses:
JAMES R. OFFIELD,
SAMUEL N. POND.